(12) United States Patent
Gensler

(10) Patent No.: US 6,821,598 B2
(45) Date of Patent: Nov. 23, 2004

(54) FLOOR COVERING FOR A POWERED VEHICLE

(75) Inventor: Manfred Gensler, Hofbiber (DE)

(73) Assignee: Dura Tufting GmbH, Fulda (DE)

( * ) Notice: Subject to any disclaimer, the term of this patent is extended or adjusted under 35 U.S.C. 154(b) by 23 days.

(21) Appl. No.: 10/034,512

(22) Filed: Dec. 28, 2001

(65) Prior Publication Data

US 2002/0197446 A1 Dec. 26, 2002

(30) Foreign Application Priority Data

Jan. 4, 2001 (DE) .......................................... 101 00 283

(51) Int. Cl.$^7$ .......................... B32B 3/06; B32B 33/00; A47G 27/00; A47G 27/02
(52) U.S. Cl. ........................... 428/95; 428/99; 428/101; 16/4; 16/8; 296/97.23; 411/508; 411/509
(58) Field of Search ............................. 428/95, 99, 101; 16/4, 8; 296/97.23; 411/508, 509

(56) References Cited

U.S. PATENT DOCUMENTS

| | | | | |
|---|---|---|---|---|
| 4,403,895 | A | * | 9/1983 | Caldwell et al. ............ 411/378 |
| 4,829,627 | A | * | 5/1989 | Altus et al. ...................... 16/4 |
| 5,384,939 | A | * | 1/1995 | Weber .......................... 24/306 |
| 5,666,691 | A | | 9/1997 | Bealing et al. |
| 5,775,859 | A | * | 7/1998 | Anscher ....................... 411/38 |
| 2001/0004784 | A1 | * | 6/2001 | Calabrese ......................... 16/8 |
| 2002/0112324 | A1 | * | 8/2002 | Iverson et al. ................ 24/444 |

FOREIGN PATENT DOCUMENTS

| | | | | |
|---|---|---|---|---|
| DE | 8224007 | | 11/1982 | |
| DE | 3238121 A | * | 4/1984 | ............ B60N/3/04 |
| DE | 4218213 C1 | * | 2/1994 | ............ B60N/3/04 |
| DE | 19617408 | | 8/1997 | |
| DE | 19823230 | | 12/1998 | |
| DE | 19805949 | | 8/1999 | |
| DE | 20001405 | | 5/2000 | |
| DE | 19955118 | | 9/2000 | |
| GB | 2082668 A | * | 3/1982 | ............ F16B/21/00 |
| GB | 2215600 | | 9/1989 | |
| JP | 11217036 A | * | 8/1999 | ............ B60N/3/04 |
| WO | 9706029 | | 2/1997 | |

* cited by examiner

Primary Examiner—Cheryl A. Juska
(74) Attorney, Agent, or Firm—Bachman & LaPointe, PC

(57) ABSTRACT

The present invention is directed to a floor covering for a powered vehicle having a base covering 44 and a least one affixing arrangement 56" for the affixing of the supplemental mat 42 to the base covering wherein the affixing arrangement 56" comprises a first affixing element 20 which may be connected releaseably with a complementary second affixing element 60 provided to the supplemental mat 42. In accordance with the present invention the first affixing element 20 is embedded in the base covering 44 wherein the upwardly extending distal end of the first affixing element 20 is provided no higher than the level of the nap side of the base covering 44. A further embodiment of the floor covering of the present invention comprises the supplemental mat 42 wherein a second affixing element 60 is invisibly provided to its underside. The driving comfort is also increased thereby, that the affixing arrangement 46 does not intrude into the foot space and a secure attachment of the supplemental mat 12 is obtained by the covering of the attaching arrangement 56.

18 Claims, 4 Drawing Sheets

FLOOR COVERING FOR A POWERED VEHICLE

FIELD OF THE INVENTION

Floor covering for a powered vehicle having a base floor covering and at least one affixing arrangement for affixing a supplemental mat to the floor covering.

DISCUSSION OF THE PRIOR ART

The state of the art recognizes a differentiable floor covering for power vehicles, which comprises a floor covering which at least directly lies on the bodywork, a plurality of attaching arrangements and a plurality of supplemental mats, whereby the latter are attachable to the floor covering by means of attaching attachments.

German patent DE19823230A1 discloses a floor covering for an automobile which comprises a carpet base and a floor mat attachable thereto. Upon the carpet base there is a provided a raised base plate with an upwardly protruding post which comprises an outwardly radialy extending head segment. The base plate is attached to the carpet base wherein links from the base plate extend thru a hole in the carpet base into which they grip. Similarly in the floor mat, a hole is provided, whose edges are fortified by a fixed strengthening element. In order to attach the floor mat to the carpet base, the post is slid thru the hole in the floor mat until the head portion protrudes on the upper side of the floor mat and grasps the strengthening element. A similar floor covering is known from GB2215600A in which the supplement mat is attached to the known floor covering by means of a screw whose head is located on the upper surface on the supplemental mat.

A further floor covering for a powered vehicle is disclosed in German patent DE19805949A. This floor covering similarly comprises a base covering and a foot mat wherein the foot mat is attached to the base covering by means of an attaching arrangement. The attaching arrangement comprises an attaching element which is attached as a raised portion on the base covering. As already described in the state of the prior art even in this case there is provided a hole in the foot mat whose edge is strengthened by means of a strengthening element. In order to attach this foot mat to the base covering, the hole is provided above the raised attaching element wherein the strengthening element overlies the raised attaching element. In conjunction therewith a bayonet portion is pushed downwardly thru the hole from above into a receiving segment in the attaching element and thus twisted that the bayonet element is connectively inserted into the attaching elements wherein a disc shaped head of the bayonet part presses downwardly upon the foot mat from above.

The above described stated of art suffers from different disadvantages. Among other things, the driving comfort in the known floor covering is restricted since the foot freedom is restricted by the attaching element. Furthermore, the known floor coverings do not provide any great security against the loosening of the supplementary, for example foot mat, from a carpet floor for example the base covering. Furthermore it has been determined that the cleaning of the carpet base such as the base covering after the supplemental, suitably foot mat, is removed, is made more difficult.

In order to meet these disadvantages it is suggested in DE19617408 that a floor covering be provided wherein the base covering has a male insertion segment which can be inserted into a female insertion segment in the supplemental mat. This female element also extends to above the surface of the supplemental mat so that foot freedom is restricted.

A similar situation exists in WO97/06029 wherein a floor covering is disclosed wherein the under surface of the supplemental mat has a raised hook and eye fastening element where may interact with a embedded hook and eye element within a floor covering.

The task of the present invention is to provide a floor covering for power vehicle comprising a base covering and a supplemental mat which provides a higher level of driving comfort wherein the cleaning of the base covering is simplified. Further it is a task of the present invention to provide a floor covering with a base covering which gives rise to a greater driving comfort.

SUMMARY OF THE INVENTION

The present invention is directed to a novel floor covering for a powered vehicle. This covering in its simplest embodiment comprises a base covering having a bottom surface, and a top surface with a nap of predetermined height, as well as a first affixing means having a proximal and distal end, This is embedded in the base covering, the distal end of the affixing means extending upwardly into the nap but not higher than the height of the nap. In a further modification there is a capping means having a proximal and distal end, releasably connectable to the distal end of the first affixing means, the distal end of the capping means extending upwardly into the nap but again not higher than the height of the nap.

In a more complete embodiment of the invention there is further at least one supplemental mat having a bottom and a top surface and also having a second affixing element. In the transportation means the supplemental mat is located above the base covering, a second affixing element being affixed to the bottom surface of the supplemental mat, located above the first affixing element and releaseably connectable therewith so that when the affixing elements are connected to each other they are not visible. Suitably, the first and the second affixing elements are mutually combinable in a form and/or force-fitting manner. Most suitably the first affixing element comprises at least one opening therein and the second affixing element comprises a protrusion that is insertable into the at least one opening in a form-fitting manner.

The combination of the protrusion with the first affixing element is secured against soiling when the former comprises a first circumferential edge. The latter comprises a second circumferential edge wherein upon insertion of the protrusion into the first affixing element the first circumferential edge is gripable by the second circumferential edge. It is particularly desirable when both the protrusion and the opening have a substantially cylindrical cross section.

The separability of these components is enhanced when the second circumferential edge comprises a plurality of radically elastically outwardly displaceable edge segments, which, suitably, upon the insertion of the protrusion, the edge segments press sidewardly against the protrusion.

It is further desirable when the second affixing element the edge segments comprise a plate attached to the bottom surface of the supplemental mat. This especially so when between bottom surface of the supplemental mat and the top of the upwardly directed distal end of the first affixing element, there is provided a sidewardly limited free space into which the plate is insertable.

The supplemental mat for use with the aforementioned base covering should have a bottom and a top surface and be provided with a second affixing element attached to the bottom surface of the mat, releaseably combinable with the first affixing element in the base covering in such a manner that when both the affixing means are combined with each other, the second affixing means is not visible. Suitably, the second affixing means comprises a protrusion most suitably where it comprises a gripable circumferential surface and it has a substantially cylindrical cross section.

Desirably the second affixing element of the supplemental mat comprises a plate attached to the bottom surface of the supplemental mat and preferably is glued or welded to the bottom surface of the supplemental mat.

The floor covering of the present to be utilized in a powered vehicle is to be understood to include under the term powered vehicles, automobiles as well as other transportation means such as for example airplanes. The floor covering comprises a base covering and at least one affixing for affixing a supplemental mat onto the base covering. The affixing means comprised a first fixing element which is releaseably connectable to a second complementary affixing element which is provided to the supplemental mat. The second affixing element is affixed to the supplemental mat whereas the first affixing element is embedded in the base covering. Herein the upwardly extending distal end of the first affixing element is a level with the nap side the base covering. In this embodiment, the base covering is generally a carpet whose upper surface has a nap. This maybe understood in 2 different ways. As to the first, it is possible that the base covering in the area of the first affixing element has an opening within which the first attaching fixing element is provided so that its distal end is in or below the level of the nap side. Alternatively it may be understood that the base covering in the area of the first affixing element is downwardly domed whereby the first affixing element is located in the dome. In this case the distal end of the first affixing element lies either under or in the level which would fit in the nap side without the dome. Further the invention can also be considered as a combination of the previously described possibilities. The floor covering of the present invention furthermore comprises at least one supplemental mat and the affixing arrangement comprises a second affixing element. The affixing element can be releasably attached to the first affixing element and is affixed to the rear side of the additional mat so that it is not visible in the combined state. This means that suitably the second affixing element is fixed to the rear side as long as the second affixing element is not accessible from the nap side of the supplemental mat but is covered and is thus invisible.

In accordance with the present invention the first affixing element never protrudes over a level on which the feet of a driver will move. The contact of the feet against the first affixing element is thus not possible so that on the one hand a greater driving comfort is yielded and on the other hand damage to the first affixing element is prevented. Furthermore the base covering is readily cleaned since contact with a vacuum cleaner or the like with the first affixing element is also excluded. Because of the particular arrangement of the first and second attaching elements several different advantages are obtained. In the first place the supplemental mat can be attached to the base covering in such a manner that is exactly follows the surface form of the underlying base covering without stepping on an upwardly directed dome immediately above the connection point. This derives therefrom that the first affixing element is embedded in the base covering so that the second affixing element connected therewith is completed taken therein without the need to elevate the supplemental mat in this area as is the case in the floor covering set forth DE224007U1 and WO97-06029.

Thus the driving comfort is raised and the resting surface for the foot of a driver is more even. Furthermore there can be no accidental sideways contact with such a doming which could lead to the loosing to the affixing arrangement and similarity to its damage. Secondly, the supplemental mat is thus more securely fixed to the base covering, the affixing arrangement is not visible from above and is covered and is not accessible. An accidentally loosing thereof by contact with the foot is therefore excluded. Thirdly the esthetic total impression is not interfered with by an visible attaching arrangement.

In a preferred embodiment of the floor covering of the present invention there is foreseen at least one covering cap which may be releaseably connected with the first affixing element. By the term covering cap one understands a part that covers the top of the first affixing element so that it is not visible. The upwardly directed distal end of the covering cap is provided in the same level as the nap side of the base covering. The covering cap on the one hand avoids the soiling of the first affixing element and on the other hand improves its optical impression.

In a further preferred embodiment the two affixing elements are form and/or force connectable with each other.

In a preferred embodiment of the floor covering of the present invention the second affixing element comprises a protrusion which fits into an opening in the first affixing element. The protrusion and the opening can be created in any desired form however they must fit into each other so that, for example, a rectangular protrusion should correspond with a similar opening.

In a further embodiment of the present invention the protrusion comprises a first circumferential edge which grips into a second circumferential edge in the opening. By the term first circumferential edge one understands an extension which extends across the entire protrusion and is directed regularly outwardly whereby the second circumferential edge runs along the circumference of the opening and is directed inwardly. The edge can both be continuous or interrupted.

Suitably both of the protrusion and the opening are constructed in a cylindrical fashion so that the connection of the supplemental mat and the base covering is also possible in custom arrangements.

In a particularly preferred embodiment of the invention the second circumferential edge is formed from a plurality of edge segments. By this one understands that the edge is formed in an interrupted manner. The edge segments are elastic and are outwardly radically displaceable. Preferably the edge segments are pushed sidewardly against the inserted protrusion. In this matter the protrusion is attached to the opening in both a form and force fitting manner, so that the secure holding of the supplemental mat on the floor on the base covering is insured.

In a particularly preferred embodiment of the invention the second affixing element has a plate provided to the supplemental mat which is affixed to the rear side of the supplemental mat. This plate makes available a large connecting surface between the rear side and the second affixing element so that a high stability is achieved.

In a particularly preferred embodiment of the invention, the second affixing element comprises a plate directed towards the supplemental mat which is attached to the rear side of the supplemental mat. The plate provides a large connecting surface between the rear side and the second affixing element so that a high stability is achieved. Preferably the plate is glued or welded onto the rear side. As welding means one may consider (for example) ultrasound-welding procedures.

In a further desirable embodiment, between the upper side of the base covering and the upwardly directed distal end of the first affixing element there is a provided a separation so that there is a free space above the affixing element into which the plate can be introduced. In this manner the female connecting part may be produced in a simpler, that is to say smaller way since it need not provide a take up space for the plate in order to prevent an upwardly directed doming in the supplemental mat.

In order to provide a high level of affixing stability of the second affixing element to the supplemental mat, in an advantageous embodiment of the invention, the plate is glued or welded to the rear side of the supplemental mat.

In a particularly preferred embodiment of the invention the floor covering comprises a base covering and at least a one affixing arrangement for affixing a supplemental mat to the base covering. The affixing means comprises a first affixing element which is releasably connected with a second affixing element which is provided to the supplemental mat. The second affixing element is affixed to the supplemental mat whereas the first affixing element is embedded in the base covering. Thus the upwardly directed distal end of the first attaching element is provided to be not higher than the level of the nap surface of the base covering. Two modes are understood thereby. On the one hand it is possible that the base covering in the area of the first affixing element is provided with an opening within which the attaching the first affixing element is provided so that the distal end is in or below the level of the nap side. Alternatively, it can be understood that the base covering in the area of the first affixing element is downwardly domed whereby the first affixing element provided in the doming, in this case the distal end of the first affixing element, is in or below the level which the nap side would be if there were no doming of the base covering. Furthermore the invention may comprise a combination of the above-identified possibilities. There is provided at least one covering cap which may be a releaseably connected with the first affixing element. By the term covering cap, one understand an element which covers the top of the first attaching element so that this is not visible. The upwardly extending distal end of the covering cap is provided in the level of the nap side of the base covering. The covering cap on the one hand prevents the soiling of the first attaching element and also brings about an improved optical impression. Additionally this increases the driving comfort since the resting surface of the foot of the driver is a more even.

BRIEF DESCRIPTION OF THE DRAWINGS

Hereinbelow the invention will be clarified with a reference to the attached figures which show.

DISCUSSION OF THE PREFERRED EMBODIMENTS

Figure 1:
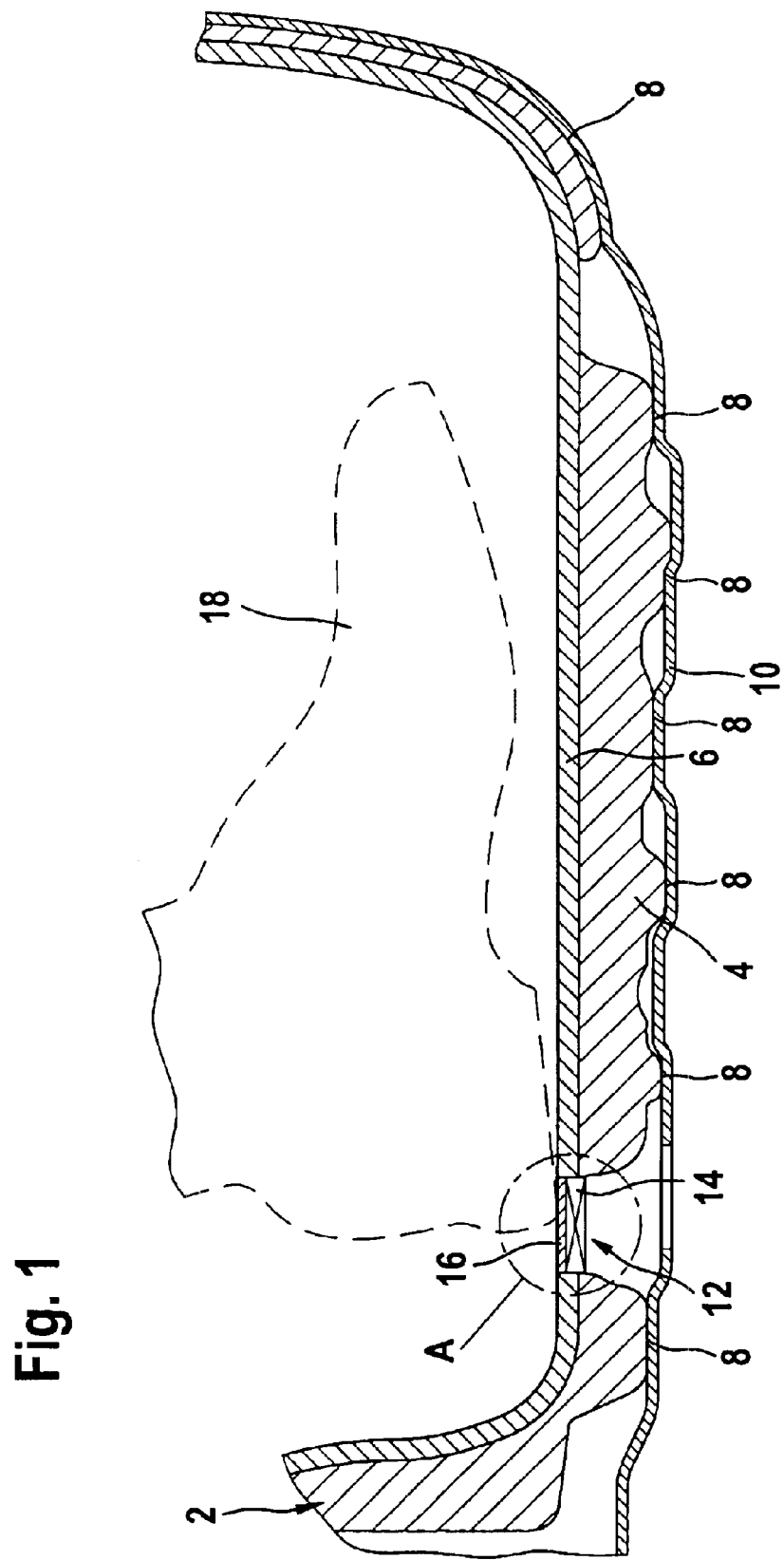
FIG. 1. a side elevational cross sectional view of the floor covering on the present invention in a first embodiment FIG. 2. is the segment A of FIG. 1 in expanded view FIG. 3. is a side elevational cross sectional view of the floor covering of the present invention in a second embodiment wherein the floor covering comprises a supplemental mat FIG. 4. is segment B of FIG. 3 in expanded view, FIG. 5. is segment B of FIG. 4 in a modified embodiment.

FIG. 1 shows the foot space within a powered vehicle in a side elevational cross sectional view, wherein the foot space of a floor covering of the present invention is shown as a first embodiment. In the first embodiment the floor covering comprises a base covering 2 wherein the base covering 2 comprises an under layer 4 and an upper layer 6. Under layer 4 comprises a predetermined surface structure, so that the base covering 2 is supported on the bodywork of the power transport means at a predetermined locations 8. The upper layer 6 on the other hand is a directed towards the foot space of the powered vehicle.

The floor covering furthermore comprises an affixing arrangement of 12 which comprises a first affixing element 14 which is releaseably connectable to a second affixing element of a (not illustrated) supplemental mat. The first affixing element 14 is attached to the base covering 2 and in the first embodiment is covered with a covering cap 16. The covering cap 16 is releaseably connected with the first affixing element 14 and covers this upwardly so that no soiling can intrude into the first affixing element 14.

Even though the covering cap 16 and the first affixing element 14 in FIG. 1 are only schematically illustrated, FIG. 1 clearly illustrates the advantages of a floor covering of the present invention in this first embodiment.

Because of the particular structure of the affixing arrangement 12, that is to say of the first affixing element 14, a higher driving comfort is provided since the affixing element 14 does not intrude into the movement area of the foot 18. An accidental contact with the affixing element 14 and a possible damage thereto is thus prevented. Furthermore the covering cap 16 prevents the soiling of the affixing element 14 and also it does not intrude into the foot space. The structure of the affixing element 14 as well as the covering cap 16 is described in more detail below with respect to FIG. 2.

Figure 2:
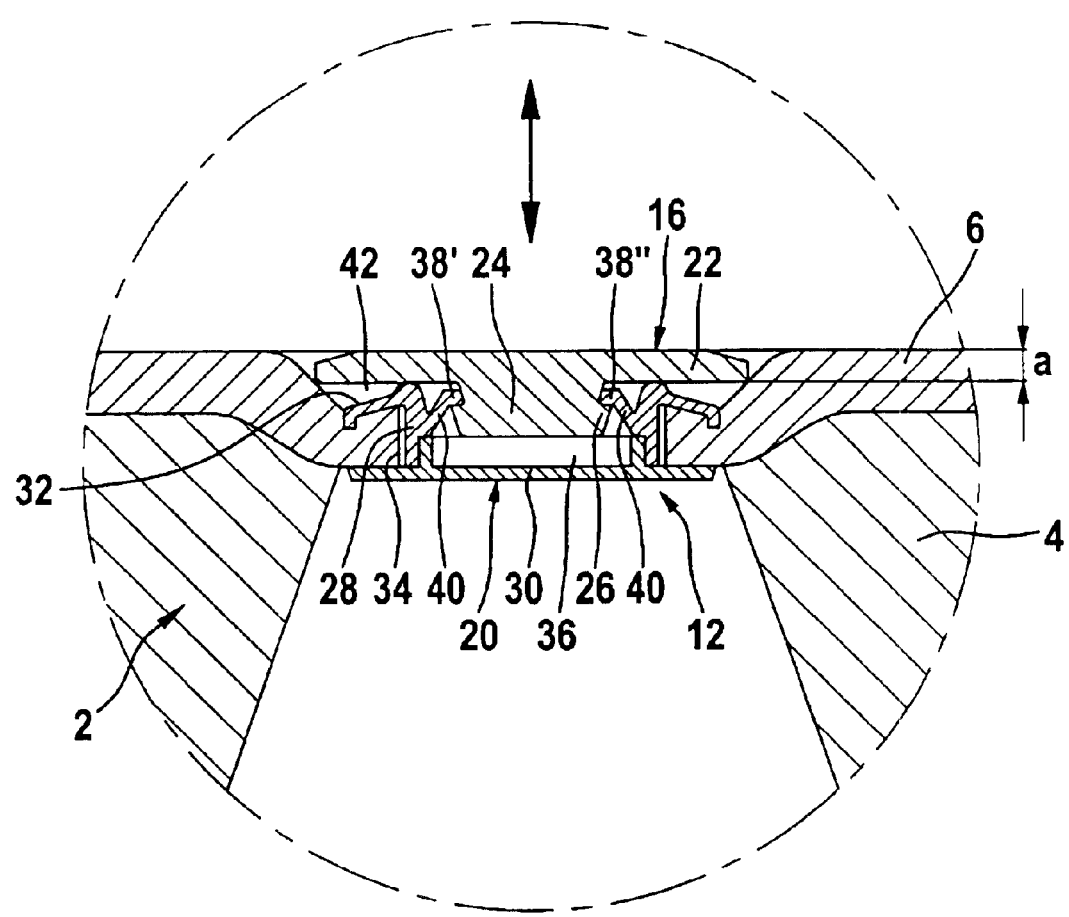

FIG. 2 a shows the affixing arrangement 12 which comprises the first affixing element 20 and the covering cap 16. The covering cap 16 comprises a circular plate 22 which at its midpoint comprises a protrusion 24. The protrusion 24 is provided in substantially cylindrical form and further comprises a circumferential edge 26 on a plate 22 which extends radically outwardly and around the cylindrical protrusion 24.

The first affixing element 20 comprises a substantially tubular element 28 and a sealing plate 30. On the tubular formed element 28 there is a provided an outwardly directed and downwardly angled collar 32. The diameter of tubular formed element 28 is minimally less than the diameter of hole 34 in the upper layer 6 of the base covering 2, wherein the under layer 4 in the area below hole 34 is interrupted. The tube formed element 28 is thus set into hole 34 in upper layer 6 so that the collar 32, whose diameter is greater than that of hole 34 lies on the upper side of upper layer 6. The closing plate 30 which similarly has a larger diameter than hole 34 is attached to tube formed element 28 which lies opposite the collar end, so that the closing plate 30 of tube formed element 28 closes this end, and grasps the upper layer 6 on the underside thereof. It will thus be seen that the interruption of the under layer 4 of the base covering 2 makes possible the provision of the closing plate 30 onto the introduced tube form 28. The first affixing element 20 is thus tightly clamped into base covering 2 wherein within the first affixing element 20 there is provided an upwardly directly directed opening 36. Within this opening 36 there is provided a second circumferential edge which extends radically inwardly on the collar end of the tube formed 28 element The second circumferential edge in opening 36 is formed from a plurality of edge segments 38', 38" of which only two are illustrated. The edge segments 38', 38" are provided on the ends thereof with elastically deformable tongues 40 wherein the tongues 40 protrude inwardly and angeled radically from the wall of opening 36. Such a construction yields low friction in the area of the circumferential edges 26, 38', 38" so that even after many insertions and separations of the covering cap 16, a secure juncture of the same is possible. The cross section of the circumferential edge 26 and the edge segments 38', 38" is illustrated in the form of a latch. The edge segments 38', 38" as illustrated in the connected condition in FIG. 2, press sidewardly against the protrusion 24 so that it is attached both in a form and force fitting manner in opening 36.

The first affixing element 20 is embedded into base covering 2. This means in the present embodiment that the first affixing element 20 is located in a dome so that the distal end of the upwardly protruding end of the tube formed element 28 is at a level no higher than the upper surface of the upper layer. While the covering cap 16 has a plate 22, the first affixing element 20 is so far embedded that between the aforesaid distal end of tube formed element 28 and the upper side of covering layer of upper layer 6 of base covering 2, there is a separation which corresponds to the thickness of plate 22. Thus, a free space 42 is provided in the area above the first affixing element 20 into which plate 22 of covering cap 16 is totally embedded so that the distal end of its upward protrusion is in the level of the nap side of the base covering 2 and does not extend into the movement space of the feet of the driver.

Figure 3:
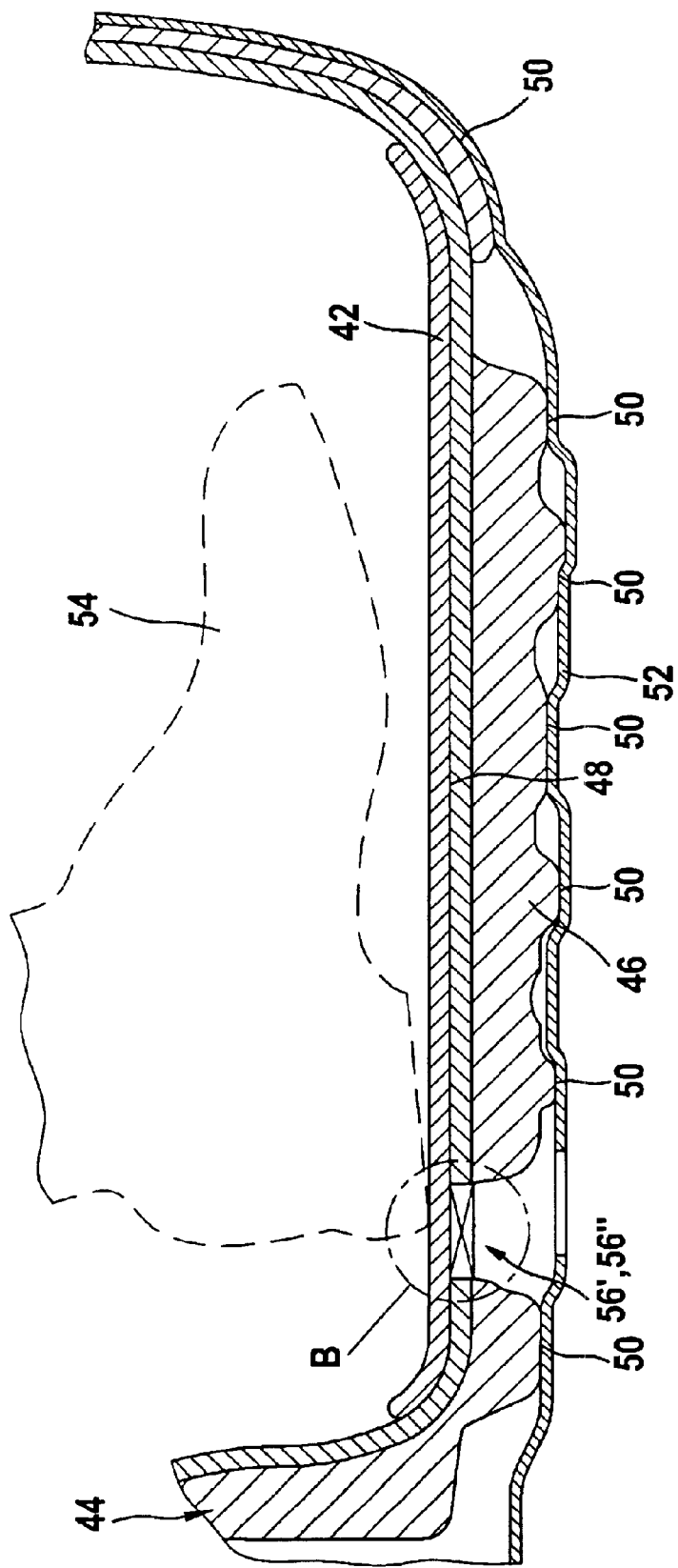

FIG. 3 shows the foot space in a powered vehicle in cross-sectional side view wherein the floor covering of the present invention is illustrated in a second embodiment. The second embodiment differentiates itself from the first embodiment of the floor covering in that at least one supplemental mat 42 is provided. The floor covering of the second embodiment comprises a base covering 44 wherein the base covering comprises a lower layer 46 and an upper layer 48. As in the first embodiment, the lower layer 46 has a surface structure so that the base layer 44 is supported on bodywork 52 at predetermined locations 50. In the area of the foot space, supplemental mat 42 lies on base covering 44 which serves to protect the base covering 44 thereunder, in particular the upper layer of 48, from soiling or loading through the feet of the driver or the driver's companion. The supplemental mat 44 is releaseably connected to the affixing arrangement 56', 56" wherein the affixing arrangement 56', 56" is only illustrated schematically in FIG. 3.

FIG. 3 illustrates the particular advantages of the floor covering of the second embodiment. Through the special construction of the affixing arrangement 56', 56" a higher driving comfort is provided which results from the absence of an upward doming of the supplemental mat 42 in the region of foot space above the affixing arrangement 56', 56". Furthermore, the supplemental mat 42 follows the contour of the base covering 44 and lies evenly upon base covering 44 so that the freedom of movement of foot 54 is in no way restricted. An accidental contact with the affixing arrangement 56', 56" and possible damage thereto, is impossible. The structure of the affixing arrangement 56', 56" is described herein below with respect to FIGS. 4 and 5.

Figure 4:
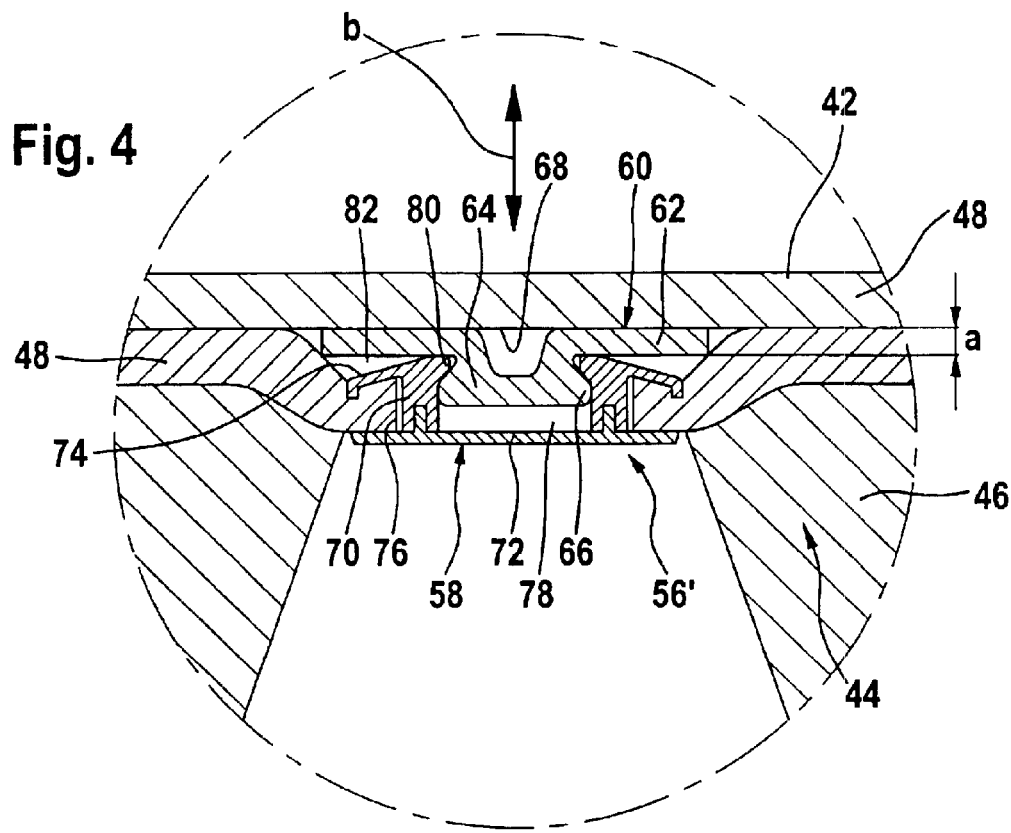

FIG. 4 shows the affixing arrangement in a first embodiment 56'. The affixing arrangement 56' comprises a first affixing element 58 and a second affixing element 60. The second affixing element 60 comprises a circumferential plate 62 which is provided at the midpoint thereof with a protrusion 64. The protrusion 64 is constructed in a basically cylindrical form and furthermore comprises a plate 62 having at the outer edge thereof, a circumferential edge 66 which runs around protrusion 64. The side of plate 62 distal from the protrusion 64 is affixed to the rear side of supplemental mat 42 suitably glued or welded thereto, wherein the term "rear side" 68 is understood covering 52 in the connected state. The side of facing the supplemental mat 42.

The first affixing element 58 comprises, a substantially a tube-formed element 70 and a closing plate 72. On the tube-formed element, there is provided an outwardly and downwardly angled collar 74. The diameter of the tube-formed element 70 is only slightly smaller than the diameter of the hole 76 in the upper layer 48 of base covering 44, wherein the under layer 46 is interrupted in the location of hole 76, the tube-formed element 70 is thus located in hole 76 in upper layer 48 so that the collar 74 lies on the upper side of upper layer 48. The closing plate 72 is thus attached to the end of the tube-formed element 70 which lies opposite to the collar side end, the closing plate 72 of tube-formed 70 closes this end and grips upper layer 48 on the underside thereof. The first affixing element 58 is thus tightly clamped with base covering 44 whereby within the first affixing element 58 an upwardly directed opening 78 is formed. Within this opening 78 there is provided a second circumferential edge 80 which protrudes radially inwardly at the collar end of the tube-formed element 70. The second circumferential edge 80 runs entirely around opening 78 and is formed as a ridge.

The first affixing element 58 is embedded in the base covering 44. As in the first embodiment, the distal upwardly directed end of the tube-formed element 70 is located at a height equivalent to the upper side of upper layer 48, suitably nap side, of floor covering 44. The second affixing element 60 has a plate 62 which is located in affixing element 58 in such a manner that between the aforesaid distal end of the tube-formed element 70 and the upper side of upper layer 48 of base covering 44, there is a separation which corresponds to the thickness of plate 62. Thus in the area above the first affixing element 58 there is provided a free space 82 into which the plate 62 fits entirely.

FIG. 4 shows the supplemental mat 42 and the base covering 44 in the combined state in which plate 62 is located within the free space 82 and the protrusion 64 lies in the opening 78 wherein the second circumferential edge 80 in the opening 78 grasps the first circumferential edge 66 on the protrusion 64 so that the supplemental mat 44 is releaseably fixed in such a manner that the supplemental mat 44 in the area substantially above the affixing arrangement 56 is neither domed upwardly nor downwardly. In order to loosen or fasten the supplemental mat 42 to or from base covering 44, movement is required in the direction of arrow B whereby the corresponding force must be applied in order to elastically deform the edges 66 and 80 so these can be separated from (or brought together) to each other.

Figure 5:
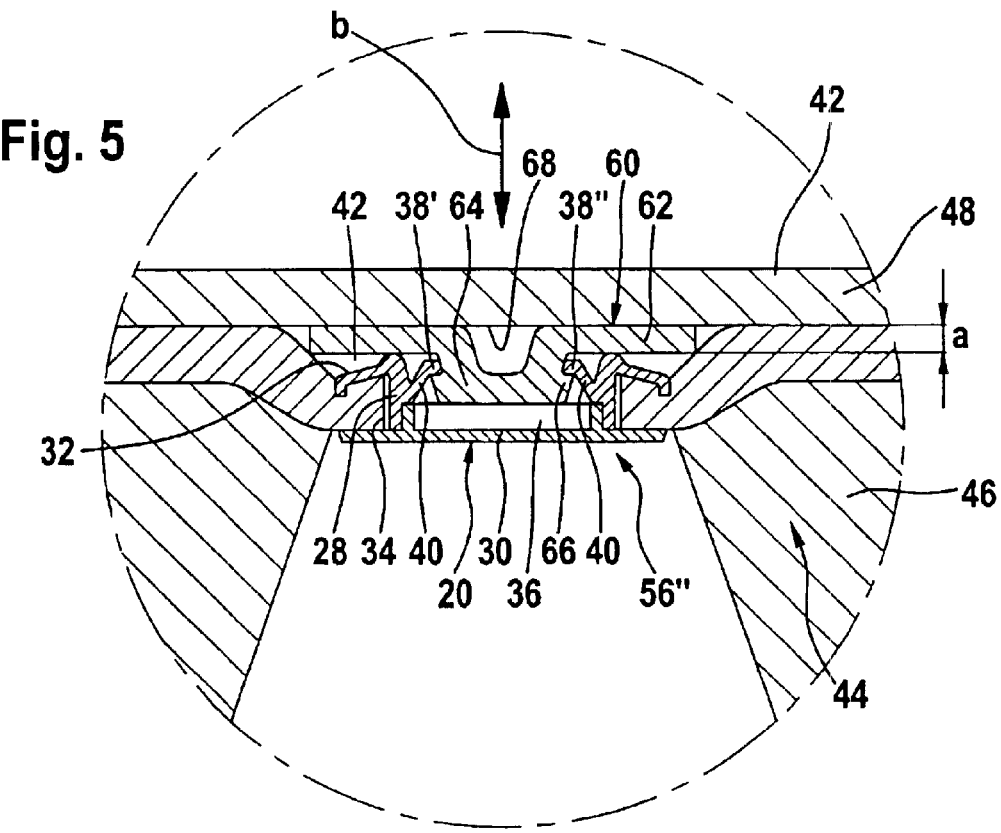

FIG. 5 shows a second embodiment 56" for the affixing arrangement which is similar to the first embodiment so that similar parts have the same indication numbers and the above-identified embodiments are correspondingly valid. In consequence thereof, we will only address the differences from the first embodiment. The first affixing element of FIG. 5 corresponds to the first affixing element 20 of FIG. 2. That is to say that the circumferential edge in opening 36 is divided into a plurality of edge segments 38', 38" located on tongue 40. Circumferential edge 66 on the protrusion 64 is not bulge formed as in FIG. 4 but instead in the form of a latch. The edge segments 38', 38" as shown in the combined state in FIG. 5, press sidewardly against the protrusion 64 so that this is both form and force locked in the opening 38. The common factor in the embodiments of FIGS. 4 and 5 is that the plate 62 lies circumferentially upon the affixing element 58, 20 in particular the tube-formed element 70, 28. In this way it is impossible that dirt particles or other soiling pass between the attaching elements which would be possible with a flat combination. Furthermore, any particles or the like, because of the angle arrangement of the collar 74, 32 fall off sideways. This gives the straight lie as well as the angled position of the collar, a safer attachment.

I claim:

1. A covering for a powered vehicle comprising a base covering having a bottom surface, and a top surface with a nap of predetermined height, and a first affixing means having a proximal and distal end, embedded in said base covering, characterized in that the distal end of said affixing means extends upwardly into said nap but not higher than the height of said nap.

2. The floor covering in accordance with claim 1 additionally comprising a capping means having a proximal and distal end, releasably connectable to the distal end of said first affixing means, the distal end of said capping means extending upwardly into said nap but not higher than the height of said nap.

3. The floor covering in accordance with claim 1 further comprising at least one supplemental mat having a bottom and a top surface and a second affixing element, said supplemental mat being located above said base covering, a second affixing element being affixed to the bottom surface of the supplemental mat, located above said first affixing element and releasably connectable therewith wherein when said affixing elements are connected to each other they are not visible.

4. The floor covering in accordance with claim 3 wherein the said first and the second affixing elements are mutually combinable in a form and/or force-fitting manner.

5. The floor covering in accordance with claim 4 wherein the said first affixing element comprises at least one opening therein and said second affixing element comprises a protrusion which is insertable into said at least one opening in a form-fitting manner.

6. The floor covering in accordance with claim 5 wherein said protrusion comprises a first circumferential edge and said first affixing element comprises a second circumferential edge wherein upon insertion of said protrusion into said first affixing element said first circumferential edge is gripable by said second circumferential edge.

7. The floor covering in accordance with claim 5 wherein both said protrusion and said opening have a substantially cylindrical cross section.

8. The floor covering in accordance with claim 6 wherein both said protrusion and said opening have a substantially cylindrical cross section.

9. The floor covering in accordance with claim 6 wherein said second circumferential edge comprises a plurality of radically elastically outwardly displaceable edge segments.

10. The floor covering in accordance with claim 9 wherein upon the insertion of said protrusion, the said edge segments press sidewardly against said protrusion.

11. The floor covering in accordance with claim 5 wherein said second affixing element comprises a plate attached to the bottom surface of said supplemental mat.

12. The floor covering in accordance with claim 11 wherein between bottom surface of the supplemental mat and the top of the upwardly directed distal end of the first affixing element, there is provided a sidewardly limited free space into which said plate is insertable.

13. The floor covering in accordance with claim 1 further comprising a supplemental mat and a top surface comprising a second affixing element attached to said bottom surface of said mat, releaseably combined with said first affixing element in said base covering in such a manner that when both said affixing means are combined with each other, said second affixing means is not visible.

14. The floor covering in accordance with claim 13 wherein said second affixing means comprises a protrusion.

15. The floor covering in accordance with claim 14 wherein said protrusion comprises a gripable circumferential surface.

16. The floor covering in accordance with claim 14 wherein the protrusion has a substantially cylindrical cross section.

17. The floor covering in accordance with claim 14 wherein said second affixing element comprises a plate attached to the bottom surface of said supplemental mat.

18. The floor covering in accordance with claim 17 wherein said plate is glued or welded to the bottom surface of said supplemental mat.

* * * * *